(12) United States Patent
Mori et al.

(10) Patent No.: US 6,491,883 B2
(45) Date of Patent: Dec. 10, 2002

(54) AIR-CLEANING PHOTOCATALYTIC FILTER

(75) Inventors: Kazuhiko Mori, Tokyo (JP); Mitsuru Nakamura, Tokyo (JP); Hidetaka Umeoka, Niiza (JP)

(73) Assignees: Nihon Parkerizing Co., Ltd., Tokyo (JP); Honda Access Corp., Niiza (JP)

( * ) Notice: Subject to any disclaimer, the term of this patent is extended or adjusted under 35 U.S.C. 154(b) by 0 days.

(21) Appl. No.: 09/745,837

(22) Filed: Dec. 26, 2000

(65) Prior Publication Data

US 2001/0014296 A1 Aug. 16, 2001

(30) Foreign Application Priority Data

Dec. 27, 1999 (JP) .............................. 11-370955

(51) Int. Cl.$^7$ .............................. A61L 9/00; B03C 3/00; B03C 3/45; B32B 3/12; B32B 18/00
(52) U.S. Cl. .............................. 422/306; 96/69; 96/98; 428/116; 428/325; 428/336; 428/375; 428/388; 428/402
(58) Field of Search ................................. 422/292, 300, 422/305–306, 311–312, 900, 906; 96/69, 98; 428/375, 388, 402–403, 336, 325, 701–702, 472, 469, 116

(56) References Cited

FOREIGN PATENT DOCUMENTS

| JP | A-7-171408 | 7/1995 |
| JP | A-8-71573 | 3/1996 |

*Primary Examiner*—Robert J. Warden, Sr.
*Assistant Examiner*—Monzer R. Chorbaji
(74) *Attorney, Agent, or Firm*—Paul E. White, Jr.; Manelli Denison & Selter PLLC

(57) ABSTRACT

A photocatalytic filter having a coating layer formed in a thickness of 5 to 60 μm on a base material and including 5 to 60% by weight of ultraviolet ray-transmissible particles (such as glass particles or fibers) having a minor axis of 0.2 to 50 μm, 20 to 80% by weight of photocatalytical particles ($TiO_2$) having an average particle size of 0.001 to 0.02 μm, 10 to 60% by weight of fine silica particles having an average particle size of 0.002 to 0.2 μm and optionally 0.2 to 20% by weight of a clay mineral material, preferably a portion of the ultraviolet ray-transmissible particles being exposed to the outside of the coating layer, exhibits a high air-cleaning activity, a high adhesion of the coating layer to the base material and a high durability in the air-cleaning activity.

8 Claims, 1 Drawing Sheet

AIR-CLEANING PHOTOCATALYTIC FILTER

BACKGROUND OF THE INVENTION

1. Field of the Invention

The present invention relates to an air-cleaning photocatalytic filter utilizing a photocatalyst capable of cleaning air by utilizing a photoreaction. More particularly, the present invention relates to an air-cleaning photocatalytic filter which is used as a filter of an air-cleaning apparatus arranged in a place exposing to natural or artificial light in a vehicle, train, ship or house, to clean the ambient air to, for example, deodorize the air.

2. Description of the Related Art

Currently, many attempts are made to utilize a photocatalyst which realizes various functions, for example, deodorization, antibacterial function and stain-proofing, upon being irradiated by the light, for the purpose of cleaning the environment.

As an air-cleaning photocatalytic method, a method in which odorous substances, for example, aldehyde compounds, in air are decomposed and removed and/or $NO_x$ gas is oxidized to convert it to nitric acid and is removed from the air by using a titanium dioxide photocatalyst, is advantageous in that no electric energy and no specific apparatus are necessary and thus the study of the practical utilization of the method has been started.

In a practical utilization of the photocatalyst, for example, Japanese Unexamined Patent Publication No. 7-171,408 discloses a utilization of a composite material having a support material and a coating layer formed on a surface of the support material and comprising a mixture of photocatalyst particles and a binder having a high resistance to photodecomposition.

In this type of the coating layer, however, since the photocatalyst particles, per se, exhibit an air-cleaning function upon absorbing ultraviolet rays therein, when the photocatalyst particle-containing coating layer is formed in a large thickness on the support material surface, only the portion of the photocatalyst particles which are located in a surface portion of the coating layer and are exposed to the irradiation of the ultraviolet rays, can fulfil the photocatalytic function. Namely, the other portion of the photocatalyst particles which are located inside of the coating layer and to which the ultraviolet rays do not reach, does not work as a photocatalyst. Thus, the photocatalyst particles contained in the coating layer exhibit an insufficient reaction efficiency.

The above-mentioned problem forms an obstructive barrier to the practical utilization of the photocatalyst particles for use in, for example, air-cleaning and water-purification, for which a high reaction rate and a high reaction efficiency are required.

As a means for solving the above-mentioned problem, for example, Japanese Unexamined Patent Publication No. 8-71573 discloses a photocatalytic method in which a light-transmissible material having a roughened surface is used as a support, and photocatalytic particles are supported on the roughened surface of the support, and thus the resultant photocatalytic coating layer has an increased surface area.

Also, Japanese Unexamined Patent Publication No. 7-171,408 discloses a photocatalytic coating layer formed from a coating liquid prepared by mixing photocatalyst particles with a binder comprising water glass and/or a silicone polymer. In this coating layer, however, the water glass and/or the silicone polymer which serves as a binder and exhibits no effect on enhancement of the photocatalytic activity of the photocatalyst particles, covers the surfaces of the photocatalyst particles and thus usually disadvantageously causes the photocatalytic activity of the photocatalyst particles to be reduced.

As mentioned above, no means for causing the all of the photocatalyst particles contained in the photocatalytic coating layer to fully function, by controlling the compositions of the coating liquid and the coating layer has been found and thus the function of the conventional photocatalytic coating layer has a limit.

Further, the above-mentioned coating layer is disadvantageous in that the coating liquid containing an alkaline material, for example, a water glass (sodium silicate) causes the support material to be corroded and the coating operation circumstances to be degraded. Also, when the coating layer contains a silicone polymer, since a catalyst, for example, an acid, must be used and/or the silicon polymer must be used together with a large amount of an organic solvent, the coating operation circumstances are deteriorated. Thus, the above-mentioned conventional photocatalytic coating layer must be further improved.

SUMMARY OF THE INVENTION

An object of the present invention is to provide an air-cleaning photocatalytic filter which is provided with a surface formed by a photocatalytic coating layer formed on a support material with a high adhesion and having an excellent durability, exhibits a high efficiency on air-cleaning including deodorization and removal of nitrogen oxides from the air, and thus is free from the disadvantageous of the conventional photocatalytic coating layer and air-cleaning photocatalytic filter, namely, a low efficiency of photocatalytic activity.

The above-mentioned object can be attained by the air-cleaning photo-catalytic filter of the present invention which comprises:

a base material, and a coating layer formed on a surface of the base material, comprising 5 to 60% by weight of ultraviolet ray-transmissible solid particles having a minor axis of the particles in the range of from 0.2 to 50 $\mu$m, 20 to 80% by weight of photocatalytic solid particles having an average particle size of 0.001 to 0.02 $\mu$m and 10 to 60% by weight of fine silica particles having an average particle size of 0.002 to 0.2 $\mu$m. and having a thickness of 5 to 60 $\mu$m.

In the air-cleaning photocatalytic filter of the present invention, the coating layer optionally further comprises 0.2 to 20% by weight of a clay mineral material.

In the air-cleaning photocatalytic filter of the present invention, at least a portion of the ultraviolet ray-transmissible solid particles located in the surface portion of the coating layer is preferably exposed to the outside of the photocatalytic filter.

In the air-cleaning photocatalytic filter of the present invention, the ultraviolet ray transmissible solid particles are preferably selected from the group consisting of pulverized glass particles and glass fibers.

In the air-cleaning photocatalytic filter of the present invention, the minor axis of the ultraviolet ray-transmissible solid particles is preferably in the range of from 0.1 to 1.5 times the thickness of the coating layer.

In the air-cleaning photocatalytic filter of the present invention, the base material preferably comprises a member selected from the group consisting of aluminum materials, paper sheets ceramic fiber nonwoven fabrics, and plastic resin materials.

In the air-cleaning photocatalytic filter of the present invention, the base material is preferably in the form of a panel, sheet or honeycomb.

In the air cleaning photocatalytic filter of the present invention, the photocatalytic solid particles are preferably selected from the group consisting of titanium dioxide particles, zinc oxide particles, strontium titanate particles and tin dioxide particles.

In the air-cleaning photocatalytic filter of the present invention, the clay mineral material preferably comprises at least a member selected from the group consisting of natural and artificial smectite, sepiolite, talc, swelling mica and kaolin.

DESCRIPTION OF THE PREFERRED EMBODIMENTS

Figure 1:
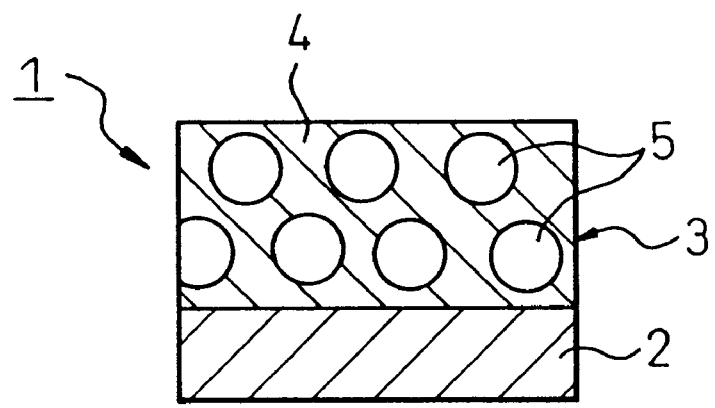
FIG. 1 is an explanatory cross-sectional view of an embodiment of the air-cleaning photocatalytic filter of the present invention.

To solve the above-mentioned problems of the conventional photocatalytic coating layer and air-cleaning photocatalytic filter, the inventors of the present invention studied the relationship between the particle size of titanium dioxide photocatalytic particles and the decomposition reaction rate of acetaldehyde by the photocatalytic particles and found that the titanium dioxide photocatalytic particles having a particle size of 0.001 to 0.05 $\mu$m have a high catalytic activity, and when the particle size is in the range of from 0.003 to 0.01 $\mu$m, the titanium dioxide particles exhibit a best photocatalytic effect.

Then, the inventors of the present invention studied the photocatalytic property of a photocatalytic coating layer formed from a coating liquid prepared by mixing the titanium dioxide photocatalytic particles having a particle size of 0.007 $\mu$m which exhibited the best photocatalytic effect in the above-mentioned study, with a binder consisting of a silicone polymer, a fluorine-containing polymer, a colloidal silica or alumina, by coating the coating liquid on an aluminum plate surface and by drying the coating liquid layer.

As a result, it was confirmed that when a polymer, for example, a silicone polymer or a fluorine-containing polymer or water glass was contained in the coating liquid, the resultant coating layer exhibited a high adhesion to the aluminum plate surface, but the photocatalytic activity and the weather-proofing property of the coating layer became significantly reduced. Also, it was confirmed that when an inorganic colloid or sol binder, for example, the colloidal silica or an alumina sol was employed, a reduction in photocatalytic activity of the resultant coating layer was relatively low, but the shrinkage of the coating layer due to drying of the coating liquid layer was large and the resultant coating layer is brittle, and thus when the coating layer was formed in a thickness of several $\mu$ms or more, the resultant coating layer was easily broken or separated from the aluminum plate surface and thus exhibited a poor practical utilizability.

The inventors of the present invention further studied, on the basis of the above-confirmed knowledge, the composition of the photocatalytic coating layer which could exhibit a photocatalytic activity equal to or higher than that of the photocatalytic particles per se, a high adhesion to the support material and a high weather-proofing property, even when the coating layer is formed at a thickness of 10 $\mu$m or more. As a result, the inventors of the present invention found that when a photocatalytic layer comprising photocatalytic solid particles, ultraviolet ray-transmissible solid particles for example, pulverized glass particles or glass fibers, having a particle size of 10 to 100 times that of the photocatalytic solid particles, fine silica particles and, optionally, clay mineral particles, is formed on a filter base material, the photocatalytic solid particles can fully exhibit the photocatalytic activity thereof and a high air-cleaning property can be imparted to the resultant filter. Also, it was found that the above-mentioned composition of the coating layer enables the shrinkage of the resultant coating layer due to the drying of the coating liquid layer to be prevented and the adhesion of the coating layer to the support surface to be enhanced. Further it was confirmed that the coating layer contains no organic solvent, and thus has a weather-proofing property and a high water resistance.

Furthermore, the inventors of the present invention analyzed the structure of the above-mentioned photocatalytic coating layer, and as a result, concluded that, in the coating layer structure, the ultraviolet ray-transmissible solid particles were located in such a manner that at least a portion of the ultraviolet ray-transmissible solid particles were located in the surface portion of the coating layer and were exposed to the outside of the coating layer, and thus the ultraviolet rays irradiated toward the surface of the coating layer could reach the inside, particularly the bottom portion of the coating layer, and the coating layer could exhibit a high air-cleaning performance such that it could not be realized by the conventional photocatalytic coating layer having the conventional composition and structure.

On the basis of the obtained knowledge and conclusion, the present invention was completed.

The air-cleaning photocatalytic filter of the present invention comprises:

a base material, and a photocatalytic coating layer formed on a surface of the base material. The coating layer comprises 5 to 60% by weight of ultraviolet ray-transmissible solid particles having a minor axis of the particles in the range of from 0.2 to 50 $\mu$m, 20 to 80% by weight of photocatalytic solid particles having an average particle size of 0.001 to 0.02 $\mu$m and 10 to 60% by weight of fine silica particles having an average particle size of 0.002 to 0.2 $\mu$m. The coating layer has thickness of 5 to 6.0 $\mu$m.

In the air-cleaning photocatalytic filter of the present invention, the coating layer optionally further comprises 0.2 to 20% by weight of a clay mineral material.

The photocatalytic coating layer allows air to permeate therethrough and serves as a filter for air.

The base material for the photocatalytic filter may be in the form of a panel, sheet, honeycomb, etc. Tc enhance the light utilization efficiency, a base material having a honeycomb structure is preferably employed. The material for forming the base material is preferably selected from aluminum materials, paper sheets, ceramic fiber nonwoven fabrics and plastic resin materials. When the paper sheets or the plastic resin materials are employed for the base material, preferably the surfaces of the material are coated with an inorganic primer.

The ultraviolet ray-transmissible solid particles usable for the present invention must have a minor axis in the range of from 0.2 to 50 $\mu$m, preferably from 0.4 to 10 $\mu$m. Also, the minor axis of the ultraviolet ray-transmissible solid particles is preferably in the range of from 0.1 to 1.5 times, more preferably 0.2 to 1.2 times, the thickness of the photocatalytic coating layer. There is no limitation to the major axis (length) of the ultraviolet ray-transmissible particles. Preferably, the major axis is in the range of from 0.4 to 200 $\mu$m. When the minor axis of the ultraviolet ray-transmissible particles is less than 0.2 $\mu$m, the resultant coating layer has an insufficient resistance to cracking and exhibits an unsatisfactory adhesion to the base material and an insufficient photo-catalytic activity. Also, when the minor axis of the ultraviolet ray-transmissible particle is more than 50 μm, the particles are easily separated from the coating layer.

The ultraviolet ray-transmissible solid particles usable for the present invention are preferably selected from those having a high transmission to ultraviolet rays having a wavelength of 300 to 400 nm. The ultraviolet ray transmitting materials are not limited to specific materials so long as the material is transmits ultraviolet rays having a wavelength within the above-mentioned range, and preferably selected from non-alkali glasses and low alkali glasses, for example, silica glasses and horosilicate glasses. Also, there is no limitation to the form of the ultraviolet ray-transmissible particles. The particles may be in the form of a ball, a flake, a plate, a needle, a fiber, etc.

In the photocatalytic coating layer of the present invention, preferably at least a portion of the ultraviolet ray-transmissible particles is exposed to the outside of the coating layer so that the light containing the ultraviolet rays irradiated toward the coating layer surface is allowed to transmit into the inside of the coating layer.

The ultraviolet ray-transmissible particles used for the present invention are contained in a content of 5 to 60% by weight in the coating layer. If the content of the ultraviolet ray-transmissible particles is less than 5%, the irradiated ultraviolet rays are difficult to reach the bottom portion of the coating layer, and thus the air-cleaning activity, for example, deodorization activity, of the coating layer is unsatisfactory. Also, if the content is more than 60% by weight, the photocatalytic particles are contained in a reduced content in the coating layer, and thus the air-cleaning activity, for example the deodorization activity, of the resultant coating layer is insufficient.

The photocatalytic solid particles usable for the present invention are preferably selected from titanium dioxide particles. However, other inorganic oxide particles such as zinc oxide particles, strontium titanate particles and tin dioxide particles, may be used as photocatalytic particles for the present invention.

The titanium dioxide photocatalytic particles are preferably prepared from titanium dioxide particles produced by a dry production method in which titanium tetrachloride is burnt and oxidized or by a hydrolysis method in which an aqueous solution of titanium sulfate or titanium chloride is subjected to a hydrolysis procedure.

Also, titanium dioxide particles or a sol thereof produced by a hydrolysis of a titanium alkoxide or titanium acetylacetonate may be employed for the present invention.

The average particle size of the photocatalytical particles usable for the present invention must be in the range of from 0.001 to 0.02 μm. If the particle size is less than 0.001 μm the small size particles exhibits a quantum size effect and thus this small size of the photocatalytic particles is disadvantageous in that they cannot be utilized for the ultraviolet rays having a long wavelength. Also, if the particle size is more than 0.02 μm, these large particles are disadvantageous in that they have a small specific surface area and thus exhibit a reduced photocatalytic activity. Preferably, the photocatalytic particles have a particle size in the range of from 0.003 to 0.01 μm. There is no limitation to the crystal form of the photocatalytic particles. In the titanium dioxide particles, the anatase crystalline particles are most preferably used for the present invention. The rutil crystalline titanium dioxide particles are the next most preferably used for the present invention. When amorphous titanium dioxide particles are used for the present invention, preferably, the resultant coating layer is dried at a temperature of 200° C. or more to convert the amorphous structure the particles to an anatase crystalline structure, and then they are used in practice.

In the present invention, the photocatalytic particles are contained in a content of 20 to 80% by weight in the photocatalytic coating layer. If the content of the photocatalytic particles is less than 20% by weight, the resultant photocatalytic coating layer exhibits an insufficient photocatalytic activity. Also, if the content is more than 80 parts by weight, the resultant coating layer is disadvantageous in that the hardness of the coating layer and the adhesion of the coating layer to the base material are insufficient.

The coating layer of the photocatalytic filter of the present invention contains fine silica particles having an average particle size of 0.002 to 0.2 μm in a content of 10 to 60% by weight. The fine silica particles may be surface-treated (modified) with a surface treating agent, for example, an alkoxysilane.

In the photocatalytic filter, the content of the fine silica particles in the photocatalytic particle-containing layer is in the range of from 10 to 60% by weight. When the content of the silica particles is within the above-mentioned range, the resultant coating layer is bonded to the base material at a high bonding strength and exhibits a satisfactory photocatalytic activity. The preferable content of the fine silica particles in the coating layer is 15 to 40% by weight.

The photocatalytic coating layer of the photocatalytic filter of the present invention optionally further contains a clay mineral material. The clay mineral material usable for the present invention is preferably selected from natural and artificial smectite, sepiolite, talc, swelling mica and kaolin. The content of the clay mineral material in the coating layer is preferably 0.2 to 20% by weight, more preferably 0.5 to 3% by weight. The particles of the clay mineral material are preferably constituted from primary particles having a primary particle size of 0.2 μm or more. The primary particles may be agglomerated with each other to form secondary particles having a secondary particle size of 0.2 to 20 μm.

The clay mineral material particles contained in the photocatalytic particle-containing coating layer of the filter of the present invention contribute to preventing crack-generation in the coating layer and to causing the resultant coating layer to exhibit a high adhesion to the base material. If the content of the clay mineral material is less than 0.2% by weight, the above-mentioned effect may be insufficiently attained, and if the content is more than 20% by weight, the resultant coating layer may exhibit a insufficient ultraviolet ray transmission, and thus the photocatalytic particles may not insufficiently work.

Figure 2:
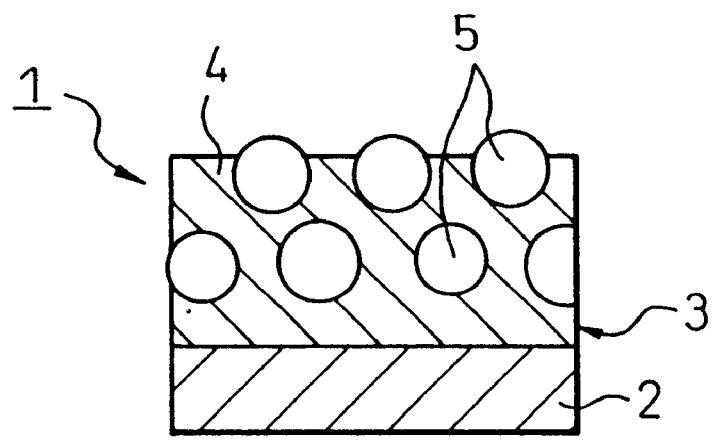
FIG. 2 is an explanatory cross-sectional view of another embodiment of the air-cleaning photocatalytic filter of the present invention.

FIGS. 1 and 2 show a constitution of the air-cleaning photocatalytic filter of the present invention, respectively.

In FIG. 1, a photocatalytic filter 1 is constituted from a base material 2 and a photocatalyst-containing coating layer 3 formed on a surface of the base material. The coating layer 3 is formed from a matrix 4 comprising fine photocatalytic particles, fine silica particles and optionally clay mineral particles and ultraviolet ray-transmissible solid particles 5 distributed in the matrix 4 and having a larger particle size than that of the above-mentioned particles in the matrix 4. The ultraviolet ray-transmissible particles 5 contribute to transmitting the ultraviolet rays irradiated to the coating layer 3 through the peripheral surfaces of the particles 5 to the photocatalytic particles distributed in the matrix 4 and enable the photocatalytic particles to attain the desired air-cleaning effect.

In the air-cleaning photocatalytic filter of the present invention, the photocatalytic coating layer comprising the above-mentioned components can transmit the ultraviolet rays irradiated toward the surface of the coating layer into the inside of the coating layer through the ultraviolet ray-transmissible particles contained therein, and thus enables the photocatalytic particles, even when they are distributed in the inside of the coating layer, to clean up air which comes into contact with the photocatalytic particles. Due to this effect, the coating layer of the present invention can be formed in a large thickness of 5 to 60 μm. In the present invention, since the coating layer formed in the above-mentioned large thickness contains the fine silica particles and optionally the clay mineral material particles, the coating layer exhibits a low shrinkage upon drying, a high bonding strength to the base material and high resistance to cracking and to peeling off of the coating layer, and allows air to penetrate into or permeate through the coating layer. Further, since the coating layer of the photocatalytic filter of the present invention contains no organic substance, the filter exhibits an excellent weather-proofing property and good water resistance.

In another embodiment of the photocatalytic filter of the present invention as shown in FIG. 2, a portion of the ultraviolet ray-transmissible particles 5 distributed in the surface portion of the coating layer 3 is preferably exposed to the outside of the coating layer 3 and another portion of the particles is embedded in the coating layer. The exposed surfaces of the ultraviolet ray-transmissible particles 5 receive the ultraviolet rays irradiated toward the surface of the coating layer, and the received ultraviolet rays are fully transmitted into the inside of the coating layer to enable the photocatalytic particles located in the inside of the coating layer to clean the air which is in contact therewith.

To distribute the ultraviolet ray-transmissible particles in the coating layer in the above-mentioned manner, the coating layer-forming liquid containing the above-mentioned components are preferably coated on a surface of a base material by a dipping method, spray method or spin coat method.

To form the coating layer as shown in FIG. 2 in which portions of the surfaces of the ultraviolet ray-transmissible particles located in the surface portion of the coating layer are exposed to the outside of the coating layer, it is preferable that the ultraviolet ray-transmissible particles have terminal end portions thereof in an acute-angled form, a low specific gravity and/or a hydrophobic property.

The photocatalytic filter of the present invention is preferably produced by preparing a coating liquid containing the components dispersed in a dispersing medium containing, as a principal component, water; coating the coating liquid on a surface of the base material; and drying the coating liquid layer on the base material to form the desired photocatalytic coating layer. The coating liquid optionally contains a dispersing agent in an appropriate content.

In the production of the air-cleaning photocatalytic filter of the present invention, the photocatalytic particle-containing coating layer is preferably formed in a dry thickness of 5 to 60 μm by coating the coating liquid in the base material by a spray method, dipping method, float coat method or brush coat method. The preferable thickness of the coating layer is 15 to 40 μm.

EXAMPLES

The present invention will be further illustrated by the following examples which are not intended to restrict the scope of present invention in any way.

Examples 1 to 8 and Comparative Examples 1 to 5

In Examples 1 to 8 and Comparative Examples 1 to 5, the following materials were employed.
(1) Ultraviolet Ray-transmissible Particles As shown in Table 1, the ultraviolet ray-transmissible particles used in Examples 1 to 5 and Comparative 2 are (A) milled fiber particles [having an average minor axis of 10 μm and a length of 30 to 100 μm] of an E glass (a low sodium content glass, made by ASAHI FIBER GLASS K.K.). Also, the ultraviolet ray-transmissible particles used in Examples 6 to 8 and Comparative Examples 3 to 5 were (B) pulverized glass particles mand by pulverizing glass balls into a particle size (minor axis) as shown in Table 1. Further, in Comparative Example 1, no ultraviolet ray-transmissible particles were employed.
(2) Photocatalytic Particles Referring to Table 1, as photocatalytic particles, (a) anatase type titanium dioxide particles having an average crystal particle size of 7 nm (trademark: ST-01, made by ISHIHARA SANGYO K.K.) were employed in Examples 1 to 8 and Comparative Examples 2 to 5. In this case, the titanium dioxide particles were mixed in an amount of about 200 g in 800 ml of water, and the mixture was treated in a homomixer to uniformly disperse the particles in water. The resultant aqueous dispersion was employed for the preparation of a coating liquid. Also, in Comparative Example 1, titanium dioxide particles having an average crystal particle size of 0.03 μm (trademark: P-25, made by NIHON AEROSIL K.K.) were employed.

The amount of the photocatalytic particles used in each of the examples and comparative examples is shown in Table 1.
(3) Silica Particles In Examples 1 to 5 and 7 and Comparative Examples 1 to 5, (i) an aqueous silica sol having an average particle size of about 0.02 μm (trademark: SNOWTEX N, made by NISSAN KAGAKU K.K.) was employed, and in Examples 6 and 8, (ii) an aqueous silica sol having an average particle size of about 0.05 μm (trademark: SNOWTEX OL, made by NISSAN KAGAKU K.K.) was employed.
(4) Clay Mineral Material In Examples 2 to 8 and Comparative Examples 1 to 3 and 5, as clay mineral material, smectite particles having a plate crystal structure and a primary particle size of 0.02 to 0.03 μm (trademark: LAPONITE, made by NIHON SILICA K.K.) were employed. Also, in Example 1 and Comparative Example 4, no clay mineral material was employed.
(5) Base Material In each of Examples 1, 4 and 7 and Comparative Examples 1, and 3 to 5, (a) an aluminum alloy plate having dimensions of 200 mm×300 mm×0.1 mm (thickness) and prepared by coating a surface of an aluminum alloy base plate with a silicone primer and drying at a temperature of 80° C. to form a primer coating layer, having a dry thickness of 3 μm, was employed as a base material.

In each of Examples 2, 3, 5, 6 and 8, and Comparative Example 2, (b) a zinc-plated sheet plate coated with a powdered polyester resin in a coating thickness of 20 μm and then with the same silicone primer in the same thickness as mentioned above was employed as a base material.

Each of the primary-coated aluminum alloy plate or the polyester and primary-coated zinc-plated steel plate was formed into a honeycomb structure (dimensions: 10 cm×10 cm×1 cm (thickness), and the resultant honeycomb was degreased. The degreased honeycomb was employed as a base material.

In each of the examples and comparative examples, a photocatalytic coating layer was formed on the base material by the following procedures.

An aqueous coating liquid containing the components shown in Table 1 and having a total solid content of 35% was prepared.

The base material (honeycomb) was immersed in the coating liquid and taken up from the coating liquid, and the amount of the coating liquid picked up on the base material was controlled to a dry weight of 10 g (corresponding to a dry thickness of about 30 μm) per base material (honeycomb) by blowing a compressed air to the surface of the base material, and drying the coating liquid layer in a drying oven at a temperature of 150° C. for 10 minutes. A dry photocatalytic coating layer was formed on the base material.

The properties of the resultant photocatalytic filter were evaluated by the following test procedures under the following evaluation standards.

(1) Adhesion of Coating Layer

To determine an adhesion of a coating layer to a base material, a coated honeycomb filter was held horizontal 30 cm above a desk, dropped onto the desk, and the amount of the coating layer separated from the base material was measured. The test result was evaluated into the following four classes.

| Class | Amount of separated coating layer |
|---|---|
| 4 | Less than 0.5 g per filter |
| 3 | 0.5 g or more but less than 1 g per filter |
| 2 | 1 g or more but less than 2 g per filter |
| 1 | 2 g or more, practically not usable |

(2) Dispersion Condition of Ultraviolet Ray-transmissible Particles in Coating Layer A cross-section of a coating layer was observed by a metal microscope to find portions of ultraviolet ray-transmissible particles exposed to the outside of the coating layer.

The test was carried out immediately after the coating and 6 months after the coating.

(3) Decomposing Activity of Filter Against Acetaldehyde

A honeycomb filter having dimensions of 10 cm×10 cm×1 cm (thickness) was placed in a heat-resistant glass cell having a capacity of 3 liters; the cell was made air-tight; a acetaldehyde gas was introduced into the cell and the concentration of the acetaldehyde gas in the cell was adjusted to about 300 ppm; and ultraviolet rays were irradiated toward the cell by using a black lamp in a downward direction with an intensity of 0.7 mW/cm$^2$, to decompose acetaldehyde. Fifteen minutes after the start of the ultraviolet ray-irradiation, the concentration of acetaldehyde in the cell was measured, and from the measurement results, a removal (decomposition) in % of the acetaldehyde was calculated.

The test results are shown in Table 1.

The test results of the examples and comparative examples shown in Table 1 clearly illustrate that the photocatalytic coating layers of the filters of Examples 1 to 8 exhibited on an excellent adhesion to the base material, an excellent weather proofing property and a superior photocatalytic activity.

However, in Comparative Example 1 in which the photocatalytic particles (b) had too large a particle size, the aldehyde-decomposition was low; in Comparative Example 2 in which the content of the silica particles was too low, the resultant coating layer exhibited too low an adhesion to the base material and was not usable in practice, in Comparative Example 3 in which the content of the photocatalytic particles in the coating layer was too low the resultant coating layer exhibited an unsatisfactory aldehyde-decomposition, and in Comparative Examples 4 and 5 in which the particle size of the ultraviolet ray-transmissible particles falls outside of the scope of the present invention, the adhesion of the resultant coating layer to the base material was insufficient.

In the air-cleaning photocatalytic filter of the present invention having a photocatalytic coating layer comprising specific ultraviolet ray-transmissible particles together with photocatalytic particles and fine silica particles and formed on a base material, both an excellent air-cleaning (deodorization) activity which could not be obtained in the prior art and a superior coating properties (a strong adhesion to base material and a high weather proofing property) of the photocatalytic coat layer were obtained. Thus, the photocatalytic filter of the present invention is useful as a deodorization filter utilizing a photocatalytic reaction for a room and a compartment in a train or aircraft containing soiled air and is practically valuable for controlling environmental pollution.

What is claimed is:

1. An air-cleaning photocatalytic filter comprising:
   a base material, and
   a coating layer formed on a surface of the base material, comprising 5 to 60% by weight of ultraviolet ray-transmissible solid particles having a minor axis of the particles in the range of from 0.2 to 50 μm, 20 to 80% by weight of photocatalytic solid particles having an average particle size of 0.001 to 0.02 μm and 10 to 60% by weight of fine silica particles having an average

TABLE 1

| | | Composition of photocatalytic coating layer | | | | | | Air-cleaning property of photocatalytic filter | | |
|---|---|---|---|---|---|---|---|---|---|---|
| | | Ultraviolet ray-transmissible particles | | | Type and content of photocatalytic particles (wt %) | Type and content of silica particles (wt %) | Content of clay mineral material (wt %) | Adhesion to base material | | Decomposition (removal) of acetaldehyde (%) |
| Example No. | Base Material | Type and minor axis (μm) | Content in coating Layer (wt %) | Exposure to outside | | | | Immediate after coating | 6 months after coating | |
| Example 1 | a | (A) 0.3–0.8 | 20 | Yes | (a) 50 | (i) 30 | — | 4 | 4 | 91 |
| 2 | b | (A) 8–12 | 25 | Yes | (a) 40 | (i) 25 | 10 | 4 | 4 | 92 |
| 3 | b | (A) 8–12 | 25 | Yes | (a) 53 | (i) 20 | 2 | 4 | 4 | 96 |
| 4 | a | (A) 8–12 | 15 | Yes | (a) 70 | (i) 14 | 1 | 4 | 4 | 94 |
| 5 | b | (A) 8–12 | 20 | Yes | (a) 60 | (i) 18 | 2 | 4 | 4 | 93 |
| 6 | b | (A) 1–3 | 20 | Yes | (a) 60 | (ii) 18 | 2 | 4 | 4 | 91 |
| 7 | a | (A) 1–3 | 30 | Yes | (a) 30 | (i) 30 | 10 | 4 | 4 | 87 |
| 8 | b | (A) 20–40 | 10 | Yes | (a) 54 | (ii) 30 | 6 | 4 | 4 | 90 |
| Comparative 1 | a | — | — | — | (b) 48 | (i) 20 | 2 | 3 | 3 | 32 |
| Example 2 | b | (A) 8–12 | 2 | No | (a) 65 | (i) 25 | 8 | 1 | 1 | 69 |
| 3 | a | (B) 8–12 | 30 | Yes | (a) 15 | (i) 40 | 15 | 3 | 3 | 28 |
| 4 | a | (B) 0.06–0.12 | 30 | Yes | (a) 50 | (i) 20 | — | 1 | 1 | 72 |
| 5 | a | (B) 70–100 | 25 | Yes | (a) 60 | (i) 10 | 5 | 2 | 1 | 76 | particle size of 0.002 to 0.2 μm, and having a thickness of 5 to 6.0 μm wherein at least a portion of the ultraviolet ray-transmissible solid particles located in the surface portion of the coating layer is exposed to the outside of the photocatalytic filter.

2. The air-cleaning photocatalytic filter as claimed in claim 1, wherein the coating layer further comprises 0.2 to 20% by weight of a clay mineral material.

3. The air-cleaning photocatalytic filter as claimed in claim 2, wherein the clay mineral material comprises at least a member selected from the group consisting of natural and artificial smectite, sepiolite, talc, swelling mica and kaolin.

4. The air-cleaning photocatalytic filter as claimed in claim 1, wherein the ultraviolet ray transmissible solid particles are selected from the group consisting of pulverized glass particles and glass fibers.

5. The air-cleaning photocatalytic filter as claimed in claim 1, wherein the minor axis of the ultraviolet ray-transmissible solid particles is in the range of from 0.1 to 1.5 times the thickness of the coating layer.

6. The air-cleaning photocatalytic filter as claimed in claim 1, wherein the base material comprises a member selected from the group consisting of aluminum materials, paper sheets, ceramic fiber nonwoven fabrics, and plastic resin materials.

7. The air-cleaning photocatalytic filter as claimed in claim 1, wherein the base material is in the form of a panel, sheet or honeycomb.

8. The air cleaning photocatalytic filter as claimed in claim 1, wherein the photocatalytic solid particles are selected from the group consisting of titanium dioxide particles, zinc oxide particles, strontium titanate particles and tin dioxide particles.

* * * * *